United States Patent
Ramos et al.

(10) Patent No.: US 10,954,856 B2
(45) Date of Patent: Mar. 23, 2021

(54) TURBOMACHINE COMPRISING A SURFACE AIR-OIL HEAT EXCHANGER BUILT INTO AN INTER-FLOW COMPARTMENT

(71) Applicant: Safran Aircraft Engines, Paris (FR)

(72) Inventors: Bruna Manuela Ramos, Moissy-Cramayel (FR); Carmen Gina Ancuta, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 162 days.

(21) Appl. No.: 16/065,500

(22) PCT Filed: Dec. 20, 2016

(86) PCT No.: PCT/FR2016/053564
§ 371 (c)(1),
(2) Date: Jun. 22, 2018

(87) PCT Pub. No.: WO2017/109374
PCT Pub. Date: Jun. 29, 2017

(65) Prior Publication Data
US 2019/0003390 A1    Jan. 3, 2019

(30) Foreign Application Priority Data

Dec. 23, 2015  (FR) ...................................... 1563234

(51) Int. Cl.
*F02C 7/14* (2006.01)
*F02K 3/115* (2006.01)
(Continued)

(52) U.S. Cl.
CPC .................. *F02C 7/14* (2013.01); *F02C 9/18* (2013.01); *F02K 3/075* (2013.01); *F02K 3/115* (2013.01);
(Continued)

(58) Field of Classification Search
CPC .... F02C 7/14; F02C 7/18; F02C 7/045; F02C 7/24; F02C 6/08; F02C 9/18;
(Continued)

(56) References Cited

U.S. PATENT DOCUMENTS 3,797,561 A * 3/1974 Clark ...................... F01D 25/18
60/39.08
9,051,943 B2 * 6/2015 Elder ...................... F02K 3/115
(Continued)

FOREIGN PATENT DOCUMENTS

EP  0 511 770 A1  11/1992
EP  2 870 341 A1   5/2015
(Continued)

*Primary Examiner* — Craig Kim
*Assistant Examiner* — Stephanie Cheng
(74) *Attorney, Agent, or Firm* — Blank Rome LLP (57) ABSTRACT

A turbomachine comprises an inter-flow compartment extending radially between first and second intermediate walls, gas bypass ducts passing through the second intermediate wall and communicating with evacuation outlets opening up into a secondary gas flow; an oil reservoir arranged in the inter-flow compartment, and a surface air-oil heat exchanger communicating with the oil reservoir for fluid circulation. Circumferentially in relation to the inter-flow compartment, the surface air-oil heat exchanger extends at least partially between the evacuation outlets which pass through the first intermediate wall.

6 Claims, 4 Drawing Sheets

(51) Int. Cl.
    *F02C 9/18*         (2006.01)
    *F02K 3/075*      (2006.01)
    *F02K 3/06*        (2006.01)

(52) U.S. Cl.
    CPC .......... *F02K 3/06* (2013.01); *F05D 2260/213* (2013.01); *F05D 2260/98* (2013.01); *F05D 2270/101* (2013.01); *Y02T 50/60* (2013.01)

(58) Field of Classification Search
    CPC .......... F05D 2260/20; F05D 2260/204; F05D 2260/213; F05D 2260/221; F05D 2260/2212; F05D 2260/2214; F05D 2260/22141; F05D 2260/96; F05D 2260/964; F05D 2260/98; F02K 3/04; F02K 3/06; F02K 3/062; F02K 3/065; F02K 3/077; F02K 3/075; F02K 3/115; F02K 1/44; F02K 1/827
    See application file for complete search history.

(56) References Cited

U.S. PATENT DOCUMENTS

| | | | | |
|---|---|---|---|---|
| 9,175,695 | B2 * | 11/2015 | Bulin | B64D 29/00 |
| 9,777,963 | B2 * | 10/2017 | Martinez | B23P 15/26 |
| 10,107,200 | B2 * | 10/2018 | Miller | F01D 25/14 |
| 2012/0114468 | A1 | 5/2012 | Elder | |

FOREIGN PATENT DOCUMENTS

| | | |
|---|---|---|
| WO | WO 2014/008158 A1 | 1/2014 |
| WO | WO 2014/151685 A1 | 9/2014 |

\* cited by examiner

TURBOMACHINE COMPRISING A SURFACE AIR-OIL HEAT EXCHANGER BUILT INTO AN INTER-FLOW COMPARTMENT

CROSS-REFERENCE TO RELATED APPLICATIONS

This application is a national stage of International Application No. PCT/FR2016/053564, filed on Dec. 20, 2016, which claims the benefit of French Patent Application No. 1563234, filed on Dec. 23, 2015, the contents of each of which are incorporated herein by reference.

TECHNICAL FIELD

The present invention relates to the field of turbomachines, i.e. gas turbine engines, in particular those intended for the propulsion of aircraft. The invention relates to the integration of an oil reservoir and an air-oil heat exchanger in such an engine.

BACKGROUND

Commercial aircraft are generally equipped with turbofan engines, which consist of a gas turbine driving a ducted fan, which is usually placed upstream of the engine. This is the case of the engine to which the invention may be applied. The mass of air sucked in by the engine is divided into a primary flow, which flows into the gas turbine or primary body, and a secondary flow, which is derived from the fan, the two flows being concentric. The primary flow, or hot flow, comes out of the fan and passes into the primary body wherein it is compressed again, heated in a combustion chamber, guided toward successive turbine stages and ejected into a primary gas flow. The secondary flow, or cold flow, is compressed by the ducted fan stage and then ejected directly without having been heated. The separation of the air mass sucked in into two flows takes place downstream of the fan, at the level of an inter-flow case that wraps around the primary flow and guides the secondary flow into a cold flow, through its external part. The primary flow is typically compressed by a first, so-called low-pressure (LP) or booster, compressor, which is driven by the same LP shaft as the fan, then in a second, so-called high-pressure (HP) compressor, driven by an HP shaft, prior to entering the combustion chamber. The two LP and HP shafts are supported by bearings, located at the front and rear of the engine, which are themselves carried by structural parts called intermediate case at the front and exhaust case at the rear.

Moreover, existing engines, such as those to which the invention may be applied, are generally equipped with devices, called discharge valves or variable bleed valves (VBVs), which allow for part of the primary flow, at the outlet of the LP compressor, to be returned into the cold flow channel wherein it blends with the secondary flow. By lowering the pressure downstream of the LP compressor, the effect of this discharge is to lower the operating point thereof and to avoid positive pumping effects. It is achieved by openings in the radially outer wall of the primary flow, between the HP and LP compressors, and by the passage of gas taken from a duct which brings it to an outlet grid placed on the radially inner wall of the secondary flow, downstream of the outlet guide vanes (OGVs) placed in the secondary flow. The openings may be doors that open, like a scooper, by rotating about an axis oriented tangentially to one of the walls of the inter-flow case or, more recently, a slot or a grid which extends circumferentially and is closed by a ring called "guillotine ring" that moves axially.

Thus, a gas turbine engine having an axis and comprising the following is known:
- a primary gas flow and a secondary gas flow located around the primary gas flow,
- a first intermediate wall to radially inwardly delimit the secondary gas flow, a duct opening up into the secondary gas flow passing through the first intermediate wall
- a second intermediate wall to radially outwardly delimit the primary gas flow,
- an inter-flow compartment extending radially between the first and second intermediate walls, air bypass ducts of the primary gas flow passing through the second intermediate wall and into the inter-flow compartment and opening up into the secondary gas flow, through the first intermediate wall, via several evacuation outlets, Moreover, providing at least one oil reservoir and means for cooling this oil, which heats in contact with the parts and components to be lubricated, is of course known on such an engine. And it has already been proposed to include an oil reservoir in the inter-flow compartment and to combine at least one surface air-cooled oil cooler (SACOC) which communicates with the oil reservoir for fluid circulation.

Arranging an annular oil reservoir in the inter-flow compartment, connected to surface air-oil heat exchangers formed by arms that extend radially into the secondary gas flow from the inter-flow compartment, is also known, for example, from patent document GB1358076A. The heat exchange surface is satisfactory, but the radial arms involve significant overall mass and aerodynamic drag.

And, EP 2870341 discloses a gas turbine engine comprising a fan case located radially outwardly of a core compartment. A compressor section is located within an engine core compartment and includes mount flanges. An oil reservoir is mounted on at least one of the fan housing and mount flanges. The oil reservoir has a cooling structure built into an outer surface so that the oil reservoir is flushed with cooling air.

For all intents and purposes, it should be noted that any "radial" direction or orientation in the present application is to be considered with respect to the aforementioned axis of the turbomachine.

SUMMARY

The solutions heretofore proposed to ensure the cooling of the oil in a surface air-oil heat exchanger and the integration of the latter in the environment of the inter-flow compartment and of the secondary gas flow are not optimal, especially in terms of size, mass, and quality of the oil cooling of the assembly formed by the surface air-oil heat exchanger(s) with the oil reservoir and the pipes connecting them. An aim of the present invention is to combine a satisfactory heat exchange surface with a limited impact on the size and mass of the system.

Also, it is therefore proposed that, circumferentially in relation to the inter-flow compartment, the surface air-cooled oil cooler (SACOC) extends at least partially between the evacuation outlets that pass through the first intermediate wall.

Thus, the circumferential spaces between the evacuation outlets will not only function as an aerodynamic surface and/or delimitation of the secondary gas flow (inner wall of the secondary flow), but also as a heat exchange surface.

Furthermore, it is advisable that, circumferentially, between the evacuation outlets, the surface air-oil heat exchanger comprises several portions to achieve a heat exchange with the gas of the secondary gas flow, which are connected one to another, at least two by two, for oil circulation.

Favourably, these heat exchange portions will be either of the following:
- built into the first intermediate wall by being formed in its thickness, and fluidly connected one to another (to ensure fluid circulation between them), through connection areas that are also built into said first intermediate wall and each adjacent to an evacuation outlet,
- fastened to the first intermediate wall, outside the inter-flow compartment and fluidly connected one to another, at least two by two, by internal ducts within said inter-flow compartment, at least one of these ducts being connected to a said heat exchange portion by a connector that passes through said first intermediate wall.

Both the aerodynamic surface/delimitation of the secondary gas flow function and that of heat exchange areas will thus be optimized, while maintaining an appropriate mechanical structuring of the wall.

Another aspect taken into account concerns assembly and/or maintenance.

The following are recommended to facilitate the above:
- that the surface air-oil heat exchanger comprises several blocks that can be separated from each other which are, in an assembled state, connected one to another, at least two by two, for oil circulation, and
- that the first intermediate wall is formed with several partial shells assembled one to another, each block of the surface air-oil heat exchanger being associated with a corresponding partial shell.

And, in an optimized manner, it is then even recommended that each block of the surface air-oil heat exchanger includes the following:
- a first and a second end substantially opposite each other, and
- an oil inlet and an oil outlet substantially located around the first and second ends, respectively, which comprise first and second connections to an engine oil circuit and to the oil reservoir, respectively.

Thus, the oil will flow in parallel in the blocks and not from one block to another.

The exchange can thus, for example and preferably, be performed over about a semicircle for each partial shell (hypothesis with two half-shells), in successive circumferential sections (hereinafter 18a, 18b, 18c, etc.) of 15° to 35° each.

Alternatively, it is proposed that each block of the surface air-oil heat exchanger (18) includes:
- a first and a second end substantially opposite each other, and
- an oil inlet and an oil outlet substantially located around the first and second ends, respectively, which comprise first and second connections to an engine oil circuit and to the oil reservoir, respectively, and a third connection between an oil inlet and an oil outlet of two adjacent blocks, so that, between the inlet and the outlet, the oil passes at least from one block to another.

Thus, the circulation of oil in the surface air-oil heat exchanger for cooling may be extended, e.g. to achieve a nearly complete revolution about the case. However, this solution is not preferred, because it is both less efficient from a thermal standpoint and imposes connections that make assembly and maintenance more complicated.

As regards the case associated with the first intermediate wall, it is moreover proposed that said wall belongs to such a case having, parallel to the engine's axis:
- a first portion having evacuation outlets between which the surface air-oil heat exchanger extends at least partly, and
- a second portion located upstream of the first portion and covered with an acoustic coating.

Thus, by having combined the oil reservoir and the surface air-oil heat exchanger in the inter-flow compartment and having arranged them as specified, an area not used by the air-oil heat exchanger may be kept on a remaining surface of an elongated case and advantageously used to apply an acoustic coating, in principle downstream of the OGVs.

In this regard, it is recommended that the invention presented above be applied to an engine:
- that comprises a low-pressure compressor and a high-pressure compressor on the primary gas flow, and
- wherein the oil reservoir and the surface air-oil heat exchanger are arranged, parallel to the axis, between the low-pressure compressor and the high-pressure compressor.

Moreover, regarding the case associated with the first intermediate wall, it can in particular be a so-called "kit engine" case, i.e. a case mechanically structured by support arms for passage of ancillaries that connect the first intermediate wall to an outer shell of the kit engine, the outer shell forming a portion of the wall which outwardly delimits the secondary gas flow. The "kit engine" case is arranged just downstream of the aforementioned intermediate case, along the engine's axis. The intermediate case is mechanically structured by the outlet guide vanes (OGVs) placed in the secondary flow.

As for the oil reservoir, thus favourably arranged in the inter-flow compartment, it can be fastened to an inter-compressor case, which then includes said second intermediate wall.

Such a fastening must be solid and may not generate mechanical forces on the first intermediate wall.

BRIEF DESCRIPTION OF THE DRAWINGS

Other details, characteristics and advantages of the invention will appear upon reading the following description given by way of a non-restrictive example while referring to the appended drawings wherein.

DETAILED DESCRIPTION

In the remainder of the description, any references to upstream (AM) and downstream (AV) is to be interpreted according to the flow direction of the fluid passing through the engine, whereas any reference to outwardly and inwardly refers to the distance of the element in question in relation to the engine's axis of rotation 100. The terms axial and radial refer to the engine's axis of rotation.

Figure 1:
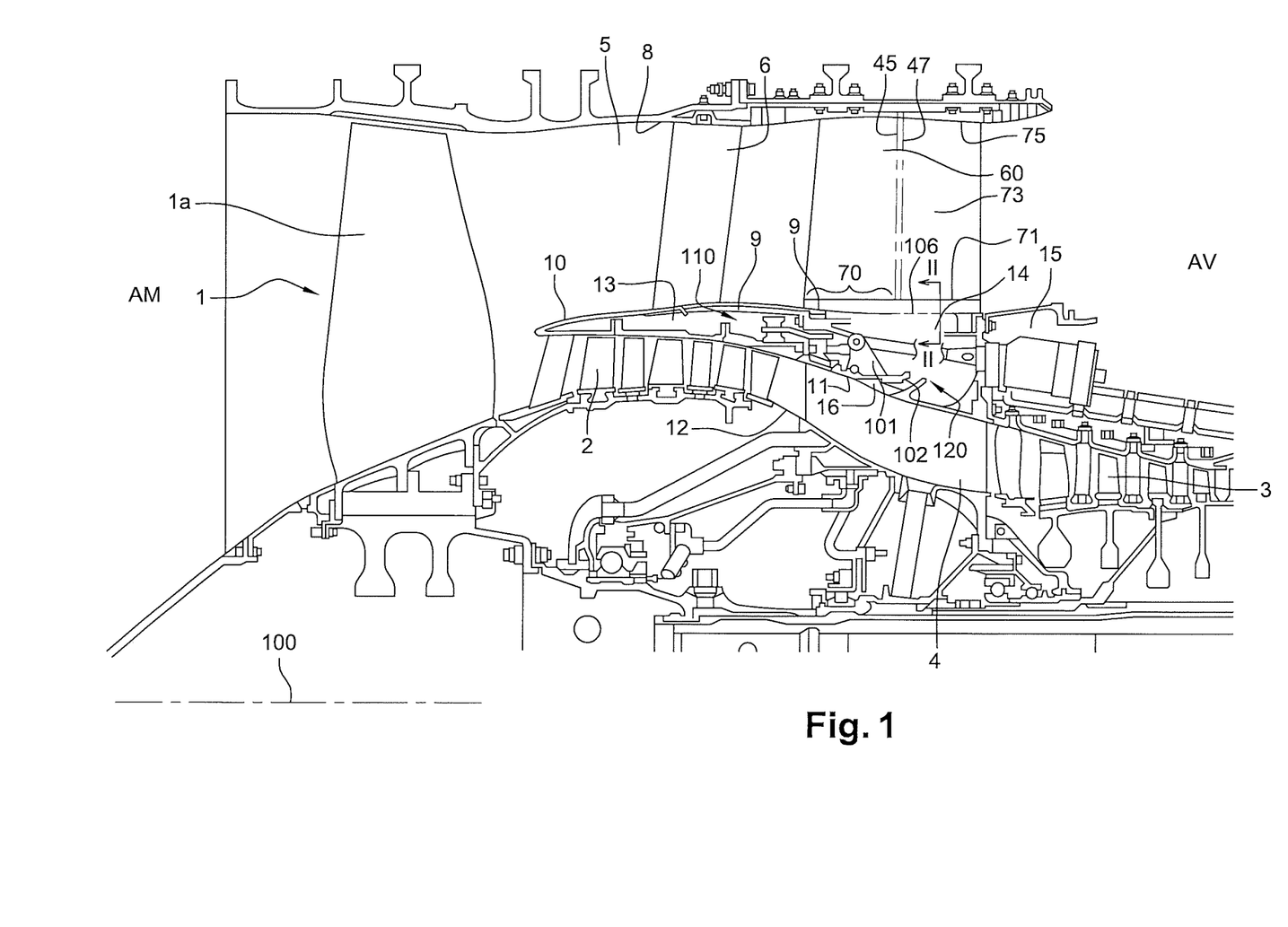
FIG. 1 is an overall sectional view of the upstream portion of a turbofan engine.

Referring to FIG. 1, the upstream portion of a turbofan engine can be seen with an axis 100 comprising a fan 1, of which a blade 1*a* is shown, and which compresses the air entering the engine before it is divided into:

a primary gas flow that circulates in a primary flow 4 by first passing through the LP compressor 2 and then through the HP compressor 3, and a secondary gas flow 120 that circulates in a secondary flow 5.

The secondary gas flow 5 is radially, respectively outwardly and inwardly, delimited by an outer wall 8 and a first intermediate wall 9.

The secondary flow is directly ejected toward the jet nozzle. Static outlet guide vanes 6 (OGVs) pass through the secondary flow. Downstream, support arms 60 for the passage of ancillaries also pass through it. They connect the upstream static structural part of the engine to the components, on the aircraft, which transfer the loads generated by the engine.

The primary gas flow 4 is radially, respectively outwardly and inwardly, delimited by a second intermediate wall 11 and an inner wall 12.

The gas circulating in this primary flow 4 passes through the LP compressor 2 for a first compression, then passes through a portion of the flow radially contained in an inter-compressor case located substantially at the axial level of the support arms 60 and undergoes a second compression by the HP compressor 3. The inter-compressor case is arranged axially between the respective cases of the LP compressor 2 and the HP compressor 3. It forms a portion of the second intermediate wall 11 and of the inner wall 12, and is surrounded by the case of the kit engine 71. The support arms 60 for the passage of ancillaries connect an inner shell of this kit engine, forming a portion of the first intermediate wall 9, to an outer shell 75 of said kit engine, forming a portion of the wall 8, which outwardly delimits the secondary gas flow 5.

The primary and secondary flows are separated immediately at the outlet of the fan wheel 1 by an inter-flow case 10, which has an upstream edge and which thickens downstream to form an inter-flow compartment 110.

The inter-flow compartment 110 may consist of three enclosures successively following one another from upstream to downstream, and comprises a first enclosure 13 located axially upstream of the support arms 60, a second enclosure 14 corresponding to the axial span of the support arms 60 and a third enclosure 15 located downstream of the support arms 60. In particular, the devices for controlling the adjustment of the blades of the HP compressor's 3 outlet guide vanes may be found in this third enclosure.

A system for possibly discharging a portion of the flow circulating in the primary flow 4, downstream of the LP compressor 2, to the secondary flow 5, is placed in the inter-flow compartment 110.

To achieve this, bypass ducts pass through the second intermediate wall 11, including the one 102 that passes into the inter-flow compartment and opens up into the secondary gas flow 5, through the first intermediate wall 9, via several evacuation outlets, among which the first evacuation outlets 106.

The bypass ducts, including the one 102, may each be accessible by a passage 16 provided in the first intermediate wall and revealed by the controlled opening of a door 101. The discharged gas stream thus passes into the second enclosure 14 and exits from it through the evacuation outlets, including the evacuation outlets 106. The movable doors 101 can be actuated by actuating cylinders.

The radial long- and short-dashed lines 45 and 47 in FIG. 1 schematically show the case of an axially shortened intermediate case 70, which is followed downstream, along the axis 100, by the adjacent kit engine 71. It should be understood that, in this case, the static outlet guide vanes 6 in FIG. 1 are displaced in place of the support arms indicated by reference number 60, and the radial support arms for the passage of ancillaries indicated by reference number 73 are located immediately downstream of the static outlet guide vanes, i.e. from the radial long- and short-dashed line 47.

Figure 2:
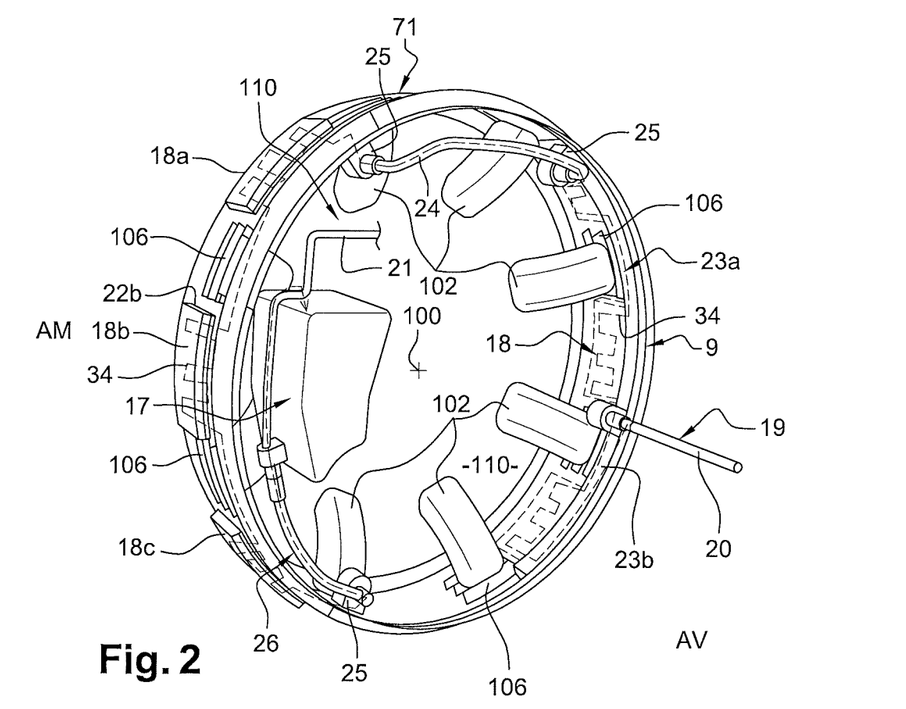
FIG. 2 shows an inter-flow wall internally carrying a surface air-cooled oil cooler (SACOC) arranged, with an oil reservoir, in an inter-flow compartment (area II-II)

FIG. 2 shows several of the bypass ducts 102 and associated evacuation outlets 106 provided in the first intermediate wall 9, which outwardly delimits the inter-flow compartment 110.

In this figure, this wall 9 may be a downstream extension of the intermediate case, or may belong to a separate downstream case that is axially adjacent to the intermediate case and referred to above as "kit engine".

The inter-flow compartment 110 encloses an oil reservoir 17 and an air-oil heat exchanger 18 that communicates with the oil reservoir for oil circulation, as soon as it is necessary to cool the oil, in particular of the engine enclosures and/or of the generator.

It will be preferred to arrange the oil reservoir 17 and the air-oil heat exchanger 18, parallel to the axis 100, substantially at the axial level of the inner shell of the kit engine.

Moreover, due to lack of space and to improve engine performance, it has been decided that the air-oil heat exchanger 18 should be a surface air-cooled oil cooler (SACOC) and to take advantage of the space (particularly circumferential) between the outlets 106 to cool the hot oil coming from the lubrication circuit 19 through the inlet 20. This hot oil is then routed to the surface heat exchanger 18, which will allow for the oil to be cooled with the air from the secondary flow 5, before the cooled oil then returns to the oil circuit, through the outlet 21.

It can thus be seen in FIG. 2 that, circumferentially in relation to the inter-flow compartment 110, the surface air-cooled oil cooler (SACOC) 18 extends at least partially between the evacuation outlets 106, which pass through the first intermediate wall 9.

Figure 3:
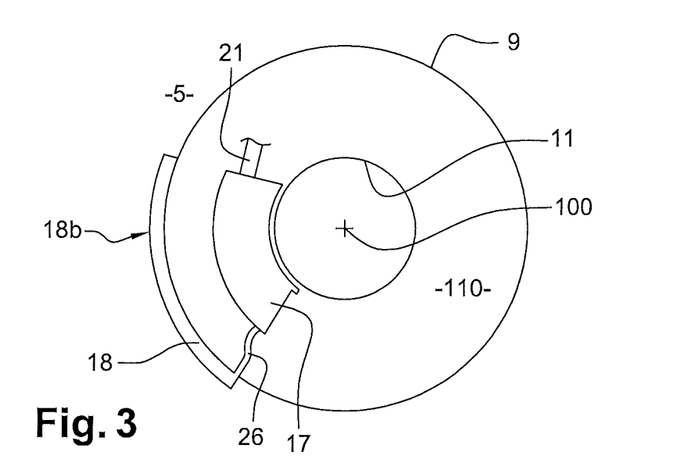
FIG. 3 schematically represents, according to the same cross-sectional area, the radially inwardly and outwardly delimiting walls of the inter-flow compartment.

As to the radial arrangement, FIGS. 2 and 3 allow showing that the oil reservoir 17 is arranged between the first and second intermediate walls 9, 11, thus in the inter-flow compartment 110, while the surface air-oil heat exchanger 18 (or 18*b*) is located around the first intermediate wall 9: built into it if it is made of one piece, or against it if the elements are structurally separate.

In order to favourably benefit from the choice to use the spaces (in particular circumferential) between the outlets 106 to cool the hot oil using a surface air-oil heat exchanger, it can be seen in FIGS. 2 and 3 that this surface air-oil heat exchanger 18 preferably comprises several portions, such as 18*a*, 18*b*, 18*c*, in which heat is exchanged with the gas of the secondary gas flow 5.

Figure 4:
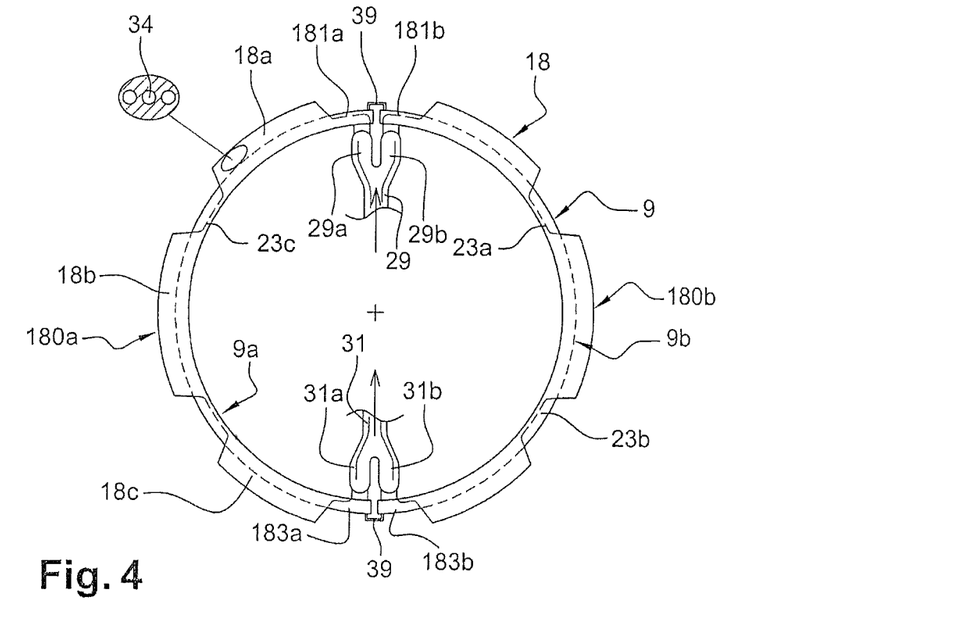
FIGS. 4 and 5 schematically represent, in the same cross-sectional area, the radially outwardly delimiting wall of the inter-flow compartment with the air-oil heat exchanger and its connections, according to various embodiments.
Figure 5:
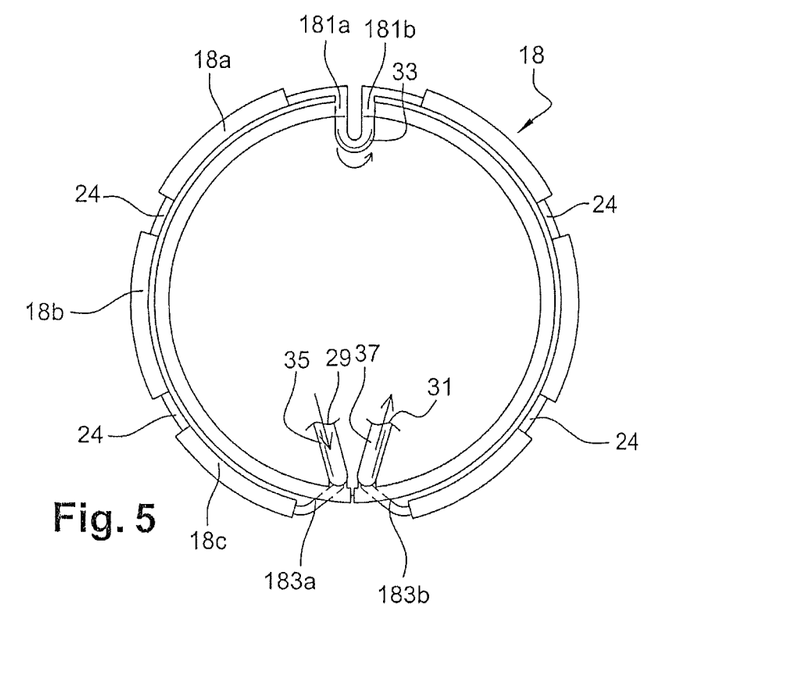

These various heat exchange portions, such as 18*a*, 18*b*, 18*c*, must therefore either be built into the first intermediate wall 9, as shown schematically in FIG. 4, or must extend onto the wall 9, outside the inter-flow compartment 110, as shown schematically in FIG. 5.

For oil circulation, the heat exchange portions 18*a*, 18*b*, 18*c*, etc. must preferably be connected one to another, at least two by two, by connection areas built into the wall 9, if not into the heat exchange portions themselves, such as 23a, 23b, 23c and/or ducts not built into the wall 9.

"Built-in areas" may therefore refer to areas built into (i.e. made of a single piece) said, or at least some of said, heat exchange portions 18a, 18b, 18c, etc.

If the heat exchange portions 18a, 18b, 18c are fastened onto, and together with, the first intermediate wall 9, these portions must be fluidly connected one to another, at least two by two, by ducts, such as those marked 24, within the inter-flow compartment 110. At least one of these inner ducts must be connected to a said heat exchange portion by a connector 25 passing through said first intermediate wall 9 (see FIG. 2).

An embodiment in which the heat exchange portions, such as 18a, 18b, 18c, will be built into the first intermediate wall 9 will imply having a sufficient wall thickness to provide oil circulation channels within it. The wall and its built-in channels may possibly be made by additive manufacturing with, for example and preferably, manufacturing in two half-shells as shown schematically in FIG. 4, to reduce costs and adequately control the shapes and thicknesses and thus promote the heat exchange without disturbing the mechanical resistance. It is the outer surface of the first intermediate wall 9 (possibly provided with fins) which will provide the heat exchange surface opposite the secondary gas flow 5.

Said heat exchange portions 18a, 18b, 18c must then be provided in the thickness of the first intermediate wall 9 and must be fluidly connected one to another by connection areas also built into this wall 9 and each must be adjacent to an evacuation outlet 106.

The circulation of oil between the operational heat exchange portions 18 (18a, 18b, 18c) should preferably be in series.

At the outlet of the last operational heat exchange block, marked 18c in FIG. 2, an external duct 26 connects this block to the oil reservoir 17.

For assembly and maintenance, the oil reservoir 17 and (the last operational block 18c of) the surface air-oil heat exchanger 18 must preferably communicate through nestable and disconnectable connection ducts. The connections of the added ducts 24 must preferably be likewise.

In order to avoid drag issues and take advantage of the available volume, it is recommended, as shown in FIGS. 2 and 5, that the outer ducts 24, 26 extend into the inter-flow compartment 110, radially inwardly with respect to the first intermediate wall 9.

The first intermediate wall 9, and more generally the case 7, may be integral, i.e. made of one piece.

However, to facilitate production, assembly and maintenance, the following is advisable, as shown in FIGS. 4, 5:
that the surface air-oil heat exchanger 18 comprises several blocks, such as 180a, 180b, that can be separated from each other, which are, in an assembled state, connected one to another, at least two by two, for oil circulation (see connection ducts 29, 31, 33, 35, 37), and
that the first intermediate wall 9 consists of several partial shells 9a, 9b assembled by mechanical connection means (screwing, etc.) 39.

In the preferred example, the heat exchanger 18 consists of two substantially semi-cylindrical blocks 180a, 180b and the first intermediate wall 9 of two half-shells. If they are built in together, as shown in FIG. 4, the form and execution of one will obviously define that of the other.

In the example shown in FIGS. 4, 5, mechanical connection means symbolized at 39 are placed at 6 o'clock and 12 o'clock between the corresponding adjacent portions of the two half-shells 9a, 9b of the first intermediate wall 9.

Furthermore, these FIGS. 4, 5 schematically show two embodiments of the way in which oil should be circulated in the surface heat exchanger 18. Their order can be reversed in the figures.

In the first embodiment, as shown in FIG. 4, each block 180a, 180b of the surface air-oil heat exchanger includes the following:
a first and a second end substantially opposite each other, respectively 181a, 181b; 183a, 183b, and
an oil inlet and outlet 29, 31 located substantially toward the first and second ends, respectively.

And, each block 180a, 180b further comprises first and second connections to an oil circuit of the engine and to the oil reservoir, respectively, marked 29a, 29b; 31a, 31b.

Thus, in the embodiment shown in FIG. 4, the oil circulates in parallel in the blocks. The oil does not circulate between the blocks 180a, 180b. In the present case, the oil supplied at the inlet 29a or 29b will thus follow a substantially semi-circular path, in sinuous channels 34 forming meanders at the location of the operational heat exchange portions 18a, 18b, 18c, etc. placed in series, as can be seen by comparing FIGS. 2 and 4.

Regarding the oil inlet and outlet 29, 31, it will be understood that, in the first case, the inlet 29 which receives oil from the engine's lubrication circuit (not shown) splits into two respective supply ducts 29a, 29b of the two blocks 180a, 180b. In the second case, the outlet 31 which returns the oil to the engine's lubrication circuit, via the reservoir 17, is a single duct coming from the connection of the two evacuation ducts 31a, 31b.

In the second embodiment, as shown in FIG. 5, each block 180a, 180b of the heat exchanger 18 has the same first and second substantially opposite ends 181a, 181b, 183a, 183b, respectively, and again an oil inlet and outlet 29, 31 located substantially toward the first and second ends, respectively.

And, the first and second connections 29, 31 to the engine's lubrication circuit and to the oil reservoir 17, respectively, allow for the oil inlet/outlet in the heat exchanger 18, while the third connection 33 between the oil outlet of the first block and the oil inlet in the second adjacent block allows the oil to pass at least from one block to another. The oil circuit in the heat exchanger 18 then substantially extends over 360° (within 20°). However, the pressure drops are greater than with the "parallel" solution shown in FIG. 4. And, the cooling performance is not necessarily better.

A solution, such as the one shown schematically in FIG. 3, in which the oil reservoir 17 is fastened to an inter-compressor case to which said second intermediate wall 11 belongs, would make it possible to secure the fastening of the oil reservoir 78, at a distance from the heat exchanger 18, which could thus be connected to the kit engine, while the oil reservoir 17 would be fastened to another case radially inward to the kit engine: the inter-compressor case. Even if it is preferred that the oil reservoir 17 be arranged within the inter-flow compartment 110, it could comprise at least one portion located apart, e.g. in a compartment of the nacelle and connected to the reservoir portion located within the inter-flow compartment by a pipe passing within a support arm 60.

Figure 6:
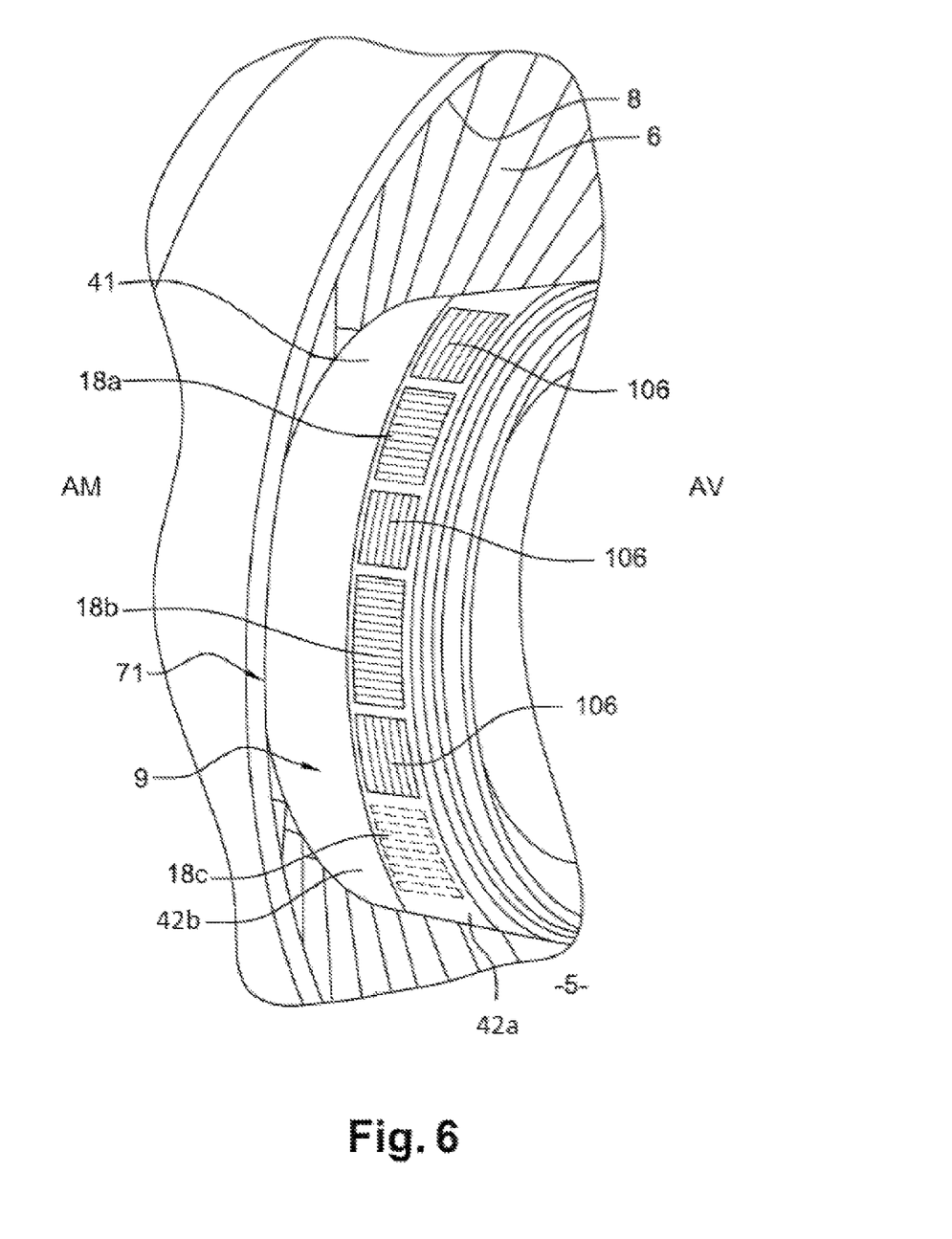
FIG. 6 is a local view of a case that is axially elongated both to carry sound-insulating material, upstream, and an air-oil heat exchanger, axially further downstream.

Now, in connection with FIG. 6, it should be noted that with a turbofan having a reduction gear (integral drive), the intermediate case and/or the kit engine may be longer, along the axis 100, due to the reduction gear downstream of the hub of the fan being built-in, part of the reduction gear then being housed radially under the inner shell of the inter-compressor case. It is toward this point that the reduction gear may be found radially inwardly in relation to the inner wall 12 and therefore to the primary flow 4. In this case in particular, it may be appropriate for said first intermediate wall 9 to belong to the kit engine or to an axially elongated intermediate case, which would include the following, parallel to the axis:
- a first portion having evacuation outlets 106 between which the surface air-oil heat exchanger 18 would extend at least partly (see through-passing portions 18a, 18b, etc.), and
- a second portion 42b located upstream of the first portion 42a and covered with an acoustic coating 41, such as a honeycomb structure.

The invention claimed is:

1. A turbomachine comprising:
    a primary gas flow, and a secondary gas flow located around the primary gas flow,
    a first intermediate wall to radially inwardly delimit the secondary gas flow,
    a second intermediate wall to radially outwardly delimit the primary gas flow,
    an inter-flow compartment extending radially between the first and second intermediate walls,
    gas bypass ducts, for allowing a bypass of gas circulating in the primary gas flow, the gas bypass ducts:
    passing through the second intermediate wall and into the inter-flow compartment, and
    opening up into the secondary gas flow, through the first intermediate wall, via several evacuation outlets,
    an oil reservoir at least partially arranged in the inter-flow compartment, and
    a surface air-oil heat exchanger that has fluid communication with the oil reservoir and which has a heat exchange surface facing the secondary gas flow,
    wherein, circumferentially in relation to the inter-flow compartment, the surface air-oil heat exchanger extends at least partially between the evacuation outlets which pass through the first intermediate wall,
    wherein the oil reservoir is fastened to an inter-compressor case to which said second intermediate wall belongs
    wherein, circumferentially, between the evacuation outlets, the surface air-oil heat exchanger comprises several heat exchange portions to achieve a heat exchange with the gas of the secondary gas flow, at least two of said heat exchange portions being connected one to another through connection areas, for oil circulation, and,
    wherein said heat exchange portions are built into the first intermediate wall by being integrally formed with the first intermediate wall, and the connection areas, which are each adjacent to an evacuation outlet, are also integrally formed with the first intermediate wall.

2. The turbomachine of claim 1, wherein;
    the first intermediate wall is circumferentially formed by a plurality of partial shells circumferentially assembled one to another, and
    each partial shell forms a block comprising one or more of the heat exchange portions and one or more of the connection areas that are integrally formed with the partial shell.

3. The turbomachine of claim 2, wherein each block includes,
    a first end and a second end substantially opposite each other, and
    an oil inlet and an oil outlet substantially located toward the first end and the second end, respectively, the oil inlet and the ail outlet comprising a first connection and a second connection, respectively, for connecting to an engine oil circuit and to the oil reservoir, respectively, so as to ensure parallel oil circulation across the blocks.

4. The turbomachine of claim 1, wherein the first intermediate wall belongs to a case having, parallel to an axis of rotation of the turbo machine:
    a first portion having said evacuation outlets between which the heat exchange portions of the surface air-oil heat exchanger extends, and
    a second portion located upstream of the first portion and covered with an acoustic coating.

5. The turbomachine of claim 1,
    which comprises a low-pressure compressor and a high-pressure compressor in the primary gas flow, and
    wherein the oil reservoir and the surface air-oil heat exchanger are arranged, parallel to an axis of rotation of the turbomachine, between the low-pressure compressor and the high-pressure compressor.

6. The turbomachine of claim 1, wherein said heat exchange portions are integral with the first intermediate wall.

* * * * *